Dec. 30, 1941.       F. L. AYERS       2,268,007
METHOD OF MAKING SHOES
Filed Aug. 25, 1938       2 Sheets-Sheet 1
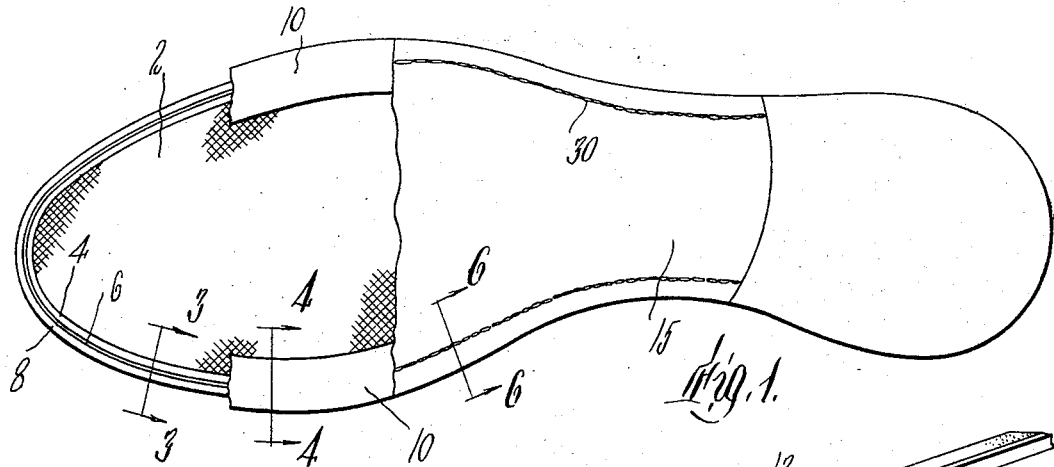
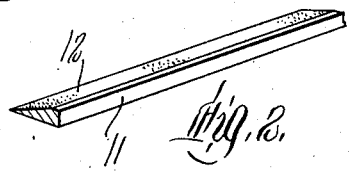
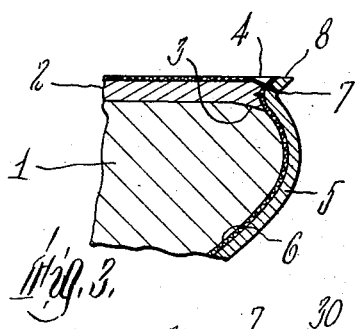
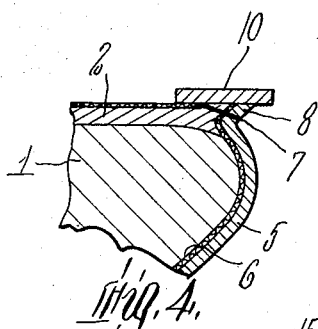
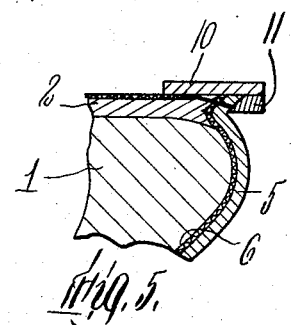
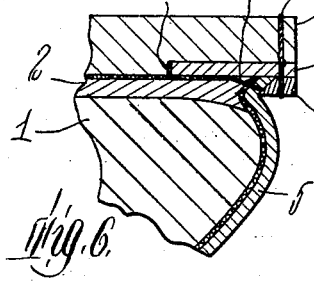
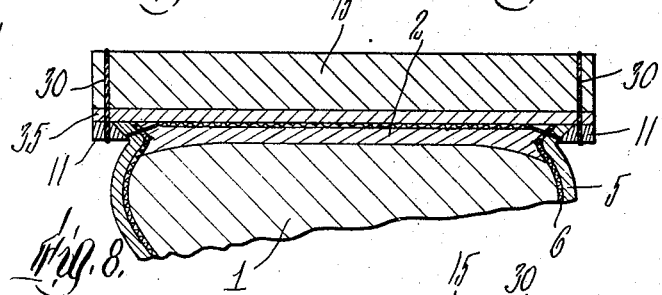
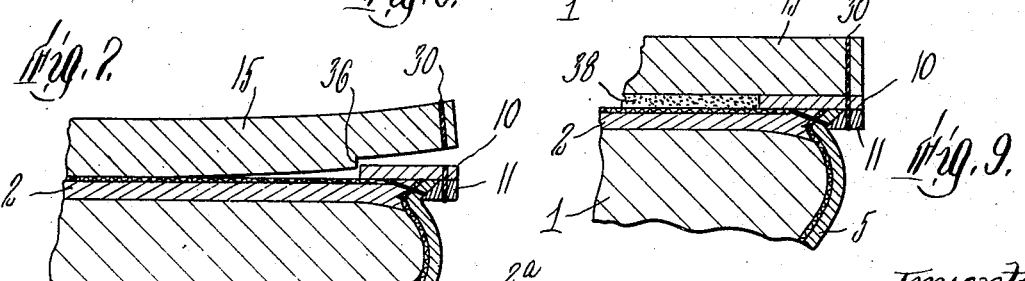
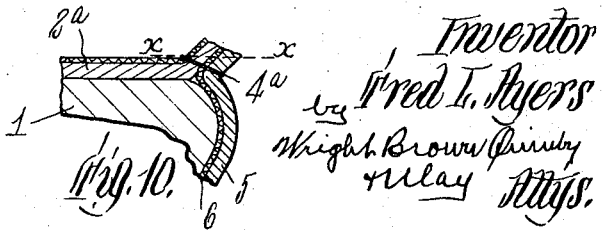
Inventor
Fred L. Ayers
by Wright, Brown, Quinby & May
Attys.

Dec. 30, 1941.   F. L. AYERS   2,268,007
METHOD OF MAKING SHOES
Filed Aug. 25, 1938   2 Sheets-Sheet 2
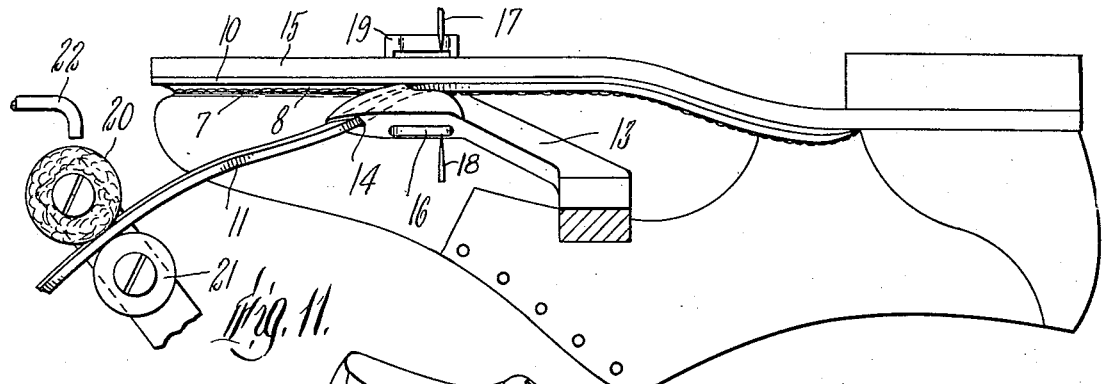
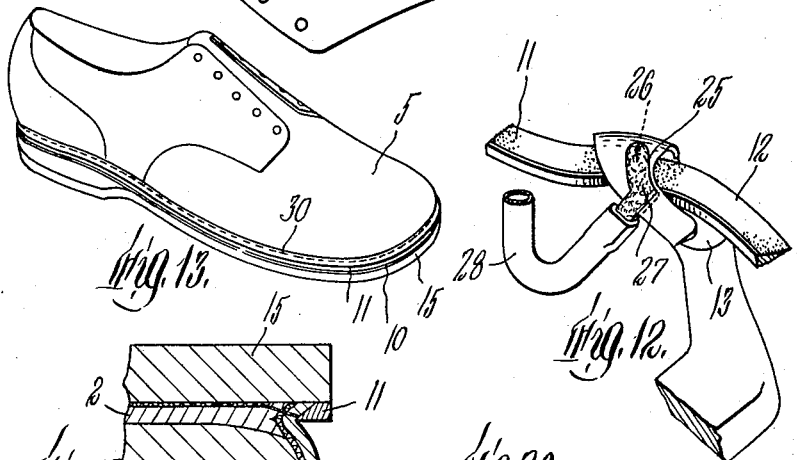
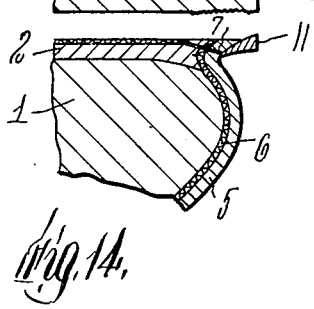
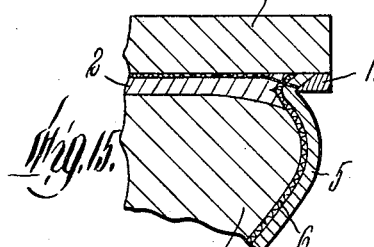
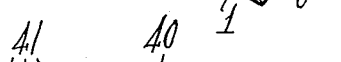
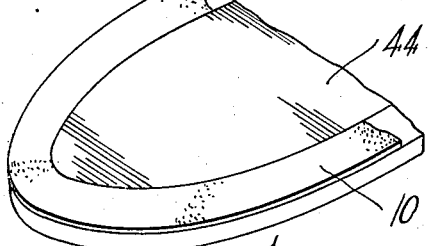
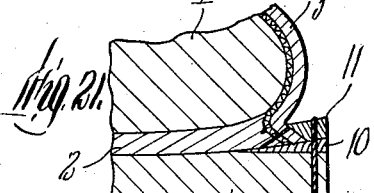
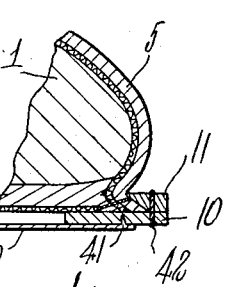
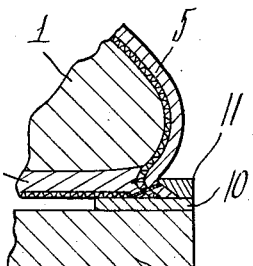
Inventor
Fred L. Ayers
by Wright, Brown, Quimby & May
Attys.

Patented Dec. 30, 1941

2,268,007

UNITED STATES PATENT OFFICE 2,268,007

METHOD OF MAKING SHOES

Fred L. Ayers, Watertown, Mass., assignor of one-half to Newton Elkin

Application August 25, 1938, Serial No. 226,641

2 Claims. (Cl. 12—142)

This invention relates to methods of making shoes of the type in which there is provided an interlock between the lasted shoe and its sole of the general type illustrated in my Patent No. 2,065,786 granted December 29, 1936, and has for an object to speed up the manufacture and to produce good shoes with less attention on the part of the various operators than has heretofore been necessary. For a complete understanding of this invention, reference may be had to the accompanying drawings in which—

Figure 1 is an inverted plan view with parts broken away of a shoe constructed in accordance with this invention.

Figure 2 is a perspective view of a piece of interlocking strip material.

Figures 3, 4 and 6 are detail sections on the correspondingly numered section lines of Figure 1.

Figure 5 is a view similar to Figure 4, but showing the strip of Figure 2 applied.

Figure 7 is a fragmentary sectional view showing the manner of removing a worn outersole for repair of the shoe.

Figure 8 is a lateral section through the lower portion of a shoe in inverted position and showing a modified construction.

Figure 9 is a fragmentary section similar to a portion of Figure 8, but showing a further modification.

Figure 10 is a fragmentary view similar to Figure 3, but showing a modification.

Figure 11 is a somewhat diagrammatic view illustrating a manner of attaching the strip of Figure 2 to both the lasted shoe and the sole.

Figure 12 is a fragmentary perspective view of the strip guide showing a different manner of activating the cement on the strip of Figure 2.

Figure 13 is a perspective view of a spring heel shoe constructed in accordance with this invention.

Figures 14 and 15 are detail sections showing a further modification.

Figure 16 is a fragmentary perspective view showing a manner of holding a marginal strip for application to a lasted shoe.

Figures 17, 18 and 19 are fragmentary sectional views illustrating successive steps in the process using the device of Figure 16.

Figure 20 is a fragmentary perspective view showing the use of an outersole to perform certain of the functions of the metal plate shown in Figure 16.

Figure 21 is a view similar to Figure 19, but showing the shoe constructed in accordance with Figure 20.

Referring first to Figures 1 to 6, inclusive, at 1 is shown a last to the sole face of which is secured an innersole 2, the edge portion of which is formed with upper and lower lips 3 and 4, which may be formed by slitting the edge of the sole inwardly, as shown, or as illustrated in my patent hereinbefore mentioned, by building up an innersole from separate layers. The upper materials, herein shown as the upper 5 and a lining 6, are lasted over and secured to the lower lip 4 as by stitching 7, the upper and lining materials being outwardly turned to form an outwardly extending and outwardly tapered marginal fin 8. Another method is shown in Figure 10 where the upper materials are secured to the edge portion of a very light weight innersole 2a as by stitching 4a. This dishes the margins which are then trimmed off as at x—x to form the tapered fin. Next a flat strip 10 is secured as by permanent cement to the lower face of the innersole, this strip 10 extending outwardly beyond the outer edge of the fin 8 as shown in Figure 4.

A locking strip 11, shown detached in Figure 2 and provided with a beveled face 12 on its flesh side where it is made of leather, this bevel being positioned to engage with the upper outwardly inclined face of the fin 8 and to cover the exposed stitching 7, is then conformed to the contour of the shoe and is cemented in position to the fin 8, to the exposed stitching and to the top face of the strip 10 which extends outwardly of the fin.

The cementing of the locking strip 11 in position, and also the securement of the locking strip 11 and the strip 10 to an outersole member 15, as shown in Figure 6, may be accomplished simultaneously. For example, as shown in Figure 11, the strip 11, which has been pre-treated with permanent cement, is fed upwardly through a guide opening 14 in a work table 13 of a stitchdown sewing machine so as to be presented into the groove formed by the top face of the strip 10, the top face of the fin 8 and the shoe upper above the line of lasting stitches, this strip being positioned above the slot 16 of the table 13 through which the curved needle 17 and awl 18 pass during the stitching operation. The presser foot 19 clamps the outersole, fin, and strip 11 together. Just before the strip 11 reaches its final position the cement with which it was pre-treated is activated by a suitable solvent, so that the cementing of the strip 11 to the top face of the fin 8 and to the exposed lasting threads is accomplished simultaneously with the stitching of this locking strip to the outersole 15 and the strip 10.

The pressing of the cemented parts together between the table and the presser foot materially increases the bonding effect between these parts, and the stitching put in while the parts are so clamped holds them in clamped position during setting of the cement. This simultaneous cementing and stitching is thus of great importance.

In Figure 11 the means for activating the cement on the locking strip is shown as comprising a felt wheel 20 with which the upper face of the locking strip contacts as it passes over a supporting roll 21, this felt wheel being maintained wet with a cement solvent which may be supplied thereto at the necessary rate, as through a pipe 22.

In Figure 12 is shown a modification in which the table 13 has a channel 25 in its upper face which communicates through a hole 26 with the interior of the slot through which the locking strip passes. A felt strip 27 is seated in this channel 25 and extends through the hole 26 where it may contact with the locking strip 11, and this felt strip is maintained wet with the cement solvent which may be supplied thereto through a pipe 28 into which one end of the felt may extend. The top face of this felt strip also contacts with the lasted shoe fin and may serve to activate this part which also may be pretreated with the cement. In case of certain types of cements, activation by other than solvents might be necessary, as, for example, by heat, in which case the mechanism would have to be designed accordingly.

The two strips 10 and 11 secured to the top and bottom faces of the fin 8 form a member which interlocks with the lasted shoe, this member in its turn being secured to the outersole. Where the securement to the outersole is by stitching, as at 30 in Figure 6, and without permanent cement, the outersole may be removed for repair by merely cutting through the threads 30 as shown in Figure 7, this releasing the outersole from the lasted shoe and leaving with the lasted shoe the member interlocked therewith to which may be stitched a new outersole.

The strip 10 forms in essence a sole member, and if desired, there may be substituted therefor a mid-sole 35 as shown in Figure 8, this mid-sole extending for the full width of the outersole, its inner portion forming a filler between the innersole and the outersole. Where the marginal strip 10 is employed instead of a mid-sole, the outersole may have its margin cut away as shown at 36 in Figure 6, the central portion of the outersole then serving as an integral filler directly contacting with the innersole. Where a mid-sole is employed, the top face of the outersole is flat from edge to edge.

In case it is desired to use the strip 10 in place of a mid-sole and to use an outersole of uniform thickness throughout, a filler 38 of any suitable type may be placed between the inner margins of the strip 10 in place of the thicker intermediate portion of the outersole illustrated in Figure 6. When the strip 10 is used the sole members may be so compacted together that no filler is necessary, particularly when a last with a "regular round bottom" is employed.

To facilitate the attachment of the strip 10 when such a strip is employed, it may be held in its properly conformed condition by securing it to a plate 40 as shown in Figure 16, this plate being provided with prongs 41 on which the strip 10 may be impaled. This strip so secured to the plate may then be presented to the lasted shoe, the cement being applied to the upper face of the strip 10 as shown in Figure 17. By forming this plate somewhat smaller than the over-all dimensions of the sole of the shoe, so that the strip 10 extends therebeyond, the plate may act as a guide to facilitate the attachment of the locking strip 11 as it is stitched in position by the outersole stitching 42 shown in Figure 18, or the plate may be removed before the stitching, if desired. The plate 40 may then be removed, if it has not been already, and the outersole 44 cemented or otherwise secured as shown in Figure 19. If desired, and as shown in Figure 20, the strip 10 may be secured as by a non-permanent cement to the outersole 44 instead of to a plate such as 40 and be presented, together with the outersole, to the lasted shoe to which it may be attached in turn by permanent cement. The outersole stitching may then be placed as shown at 30 in Figure 21, either simultaneously with the application of the locking strip 11 as shown in Figure 10, or after the securement of this locking strip, as desired. The strip 10 may be beveled, or the pressure between the parts may condense it so that no filler between the inner and outersoles is required.

Where a close edge shoe is desired, the strip 11 may be narrow and cemented to the top face of the lasted shoe fin, and then its lower face and the lower face of the fin may be cemented directly to the outersole as shown in Figure 14 without the interposition of the strip 10 or a mid-sole.

Where the method of this invention is to be applied in the making of spring heel shoes as shown in Figure 13, the locking strip 11 is carried entirely around the periphery of the shoe and the securing of the outersole, including the spring heel, may be by stitching or other suitable means, and if desired the strip 11 may be cemented in position to the lasted shoe fin and stitched to the outersole simultaneously, as previously described.

From the foregoing description of this invention and structures which may be produced by its employment, it should be evident to those skilled in the art that various other changes and modifications might be made without departing from the spirit or scope of this invention as defined by the appended claims.

I claim:

1. The method of making a shoe, which comprises lasting the shoe with its upper margins secured to an innersole and outwardly turned to form an outwardly projecting marginal fin, securing a marginal strip flat against said innersole and underlying and projecting outwardly beyond said fin, placing an outersole in position underlying said marginal strip, and progressively conforming and cementing a locking strip to the top face of said fin and simultaneously stitching said locking strip to said marginal strip and to said outersole.

2. The method of making a shoe, which comprises thread lasting the shoe with its upper margin secured to an innersole and outwardly turned to form an outwardly projecting fin exposing the lasting stitches on its upper face, securing a member to the lower face of said innersole by permanent cement, and then progressively applying a solvent to a face of a strip pre-coated with cement, conforming and securing said strip at said face to said fin and exposed stitches by said cement, and simultaneously stitching said strip to an outersole underlying said innersole and fin.

FRED L. AYERS.